2 Sheets--Sheet 1.

J. D. CONNER, M. G. FREEMAN & M. FALOON.
Ice Cream Freezers.

No. 151,093. Patented May 19, 1874.

2 Sheets--Sheet 2.
J. D. CONNER, M. G. FREEMAN & M. FALOON.
Ice Cream Freezers.
No. 151,093. Patented May 19, 1874.
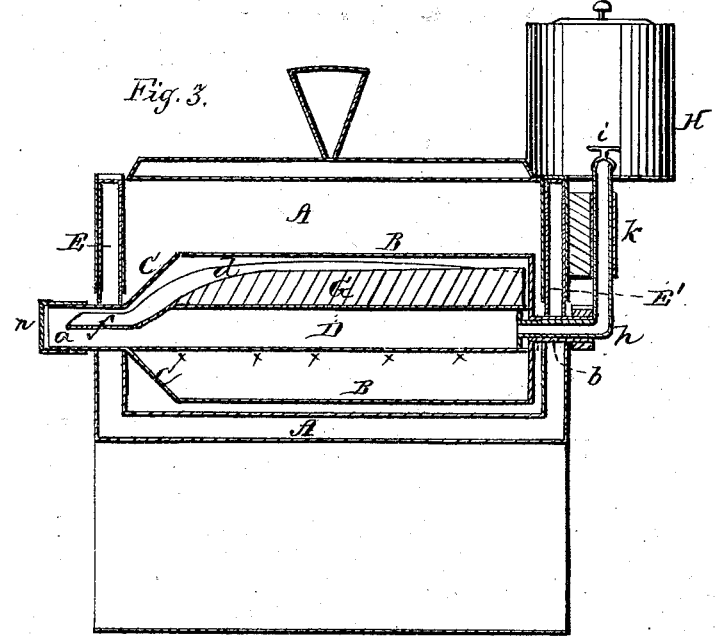
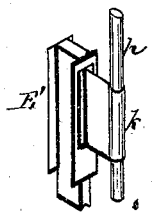
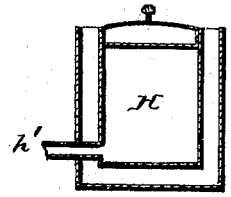
WITNESSES.
F. H. Schott.
C. L. Ernst.
INVENTOR
John D. Conner
Moody G. Freeman
Matthew Faloon
By Alexander & Mason
Attorneys.

UNITED STATES PATENT OFFICE.

JOHN D. CONNER, MOODY G. FREEMAN, AND MATTHEW FALOON, OF BLOOMINGTON, ILLINOIS; SAID FREEMAN ASSIGNOR TO SAID CONNER AND FALOON.

IMPROVEMENT IN ICE-CREAM FREEZERS.

Specification forming part of Letters Patent No. 151,093, dated May 19, 1874; application filed April 22, 1874.

*To all whom it may concern:*

Be it known that we, JOHN D. CONNER, MOODY G. FREEMAN, and MATTHEW FALOON, of the city of Bloomington, in the county of McLean and State of Illinois, have jointly invented a new and useful Improvement in Ice-Cream Freezers; and do hereby declare that the following is a full, clear, and exact description thereof, reference being had to the accompanying drawings and to the letters of reference marked thereon, making a part of this specification.

The nature of our invention consists in the construction and arrangement of an ice-cream freezer, as will be hereinafter more fully set forth.

In order to enable others skilled in the art to which our invention appertains to make and use the same, we will now proceed to describe its construction and operation, referring to the annexed drawings, in which—

Figure 1:
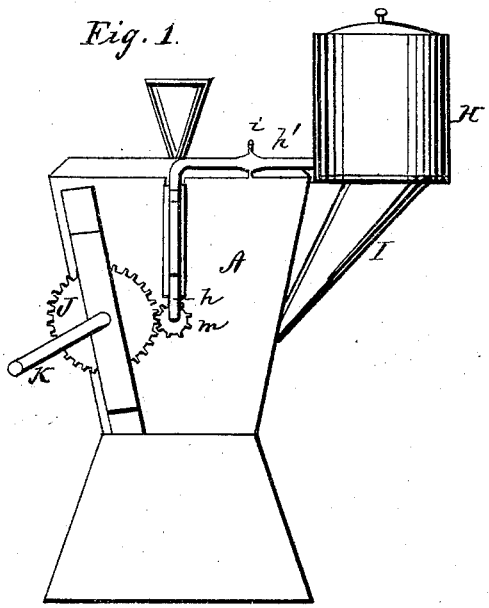
Figure 2:
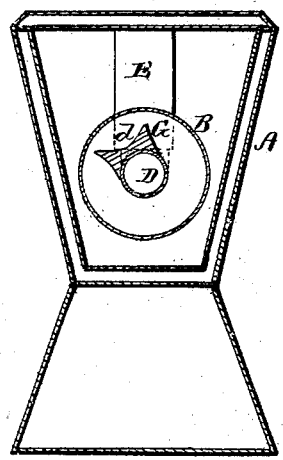

Figure 1 is an end elevation, Fig. 2 a transverse vertical section, and Fig. 3 a longitudinal vertical section, of our ice-cream freezer. Figs. 4, 5, and 6 are detached views of certain parts thereof.

A represents the ice-box of our freezer, constructed in any suitable form and dimensions, with double walls, packed with any suitable non-conducting material, forming a refrigerator from the interior revolving cylinder B. This cylinder is conical at one end, as shown at C, and from the apex of the cone extends a short tube, $a$. The other end of the cylinder is provided with a tube, $b$, extending outward on a line with the axis of the cylinder. The two tubes $a$ and $b$ form the journals for the cylinder, which journals are placed in vertical slots in the ends of the box A, and in said slots, above the journals, are placed flanged slides E E', respectively, which are made double, and, being flanged, cannot come out accidentally, and will prevent the escape of any water. Centrally through the cylinder B passes a hollow tube, D, which is closed at both ends, and provided with a series of perforations, $x$ $x$, along its under side, and on the upper side of said tube is attached a scraper, G, made twisted, as shown, and with a trough, $d$, in its upper edge. This trough is narrow and shallow at the square end of the cylinder, and wide and deep at the conical end of the cylinder. At this end the pipe and scraper terminates in a semi-tubular scraper, $f$, which is inserted and fits into the tube or bearing $a$ of the cylinder B. At the opposite end of the perforated pipe D is inserted a tube, $h$, which passes through the tubular bearing $b$, and at the outer end of the same the tube $h$ is bent vertically upward. This vertical part of the tube $h$ is held firm by means of a tubular cleat or rib, $k$, projecting from the outer side of the slide E'. In the upper end of the tube $h$ is inserted the end of a pipe, $h'$, which leads from a milk-tank, H, and is provided with a stop-cock, $i$, as shown in Fig. 1. The tank H is made double, as shown in Fig. 6, and is supported on a stool or support, I, attached to the outside of the box A. On the tubular bearing $b$ is secured a pinion, $m$, which gears with a cog-wheel, J, having a crank, K, on the outer end of its shaft. The outer end of the bearing $a$ is closed by a cap, $n$.

The milk passes from the tank H through the pipes or tubes $h'$ $h$ into the stationary perforated pipe D, from which the milk is distributed over the bottom of the cylinder B. This cylinder is kept constantly revolving by means of the crank K. The scraper G receives the cream in its trough $d$, and discharges out through the outlet-bearing $a$, the cap $n$ on the same having been previously removed. The scraper $f$ in this outlet facilitates the discharge of the cream. The cylinder, being cone-shaped at the discharge end, enables the operator to remove all the cream from the cylinder, and, by means of having the milk in a separate vessel or tank, it can be introduced as wanted while the cylinder is in motion, the amount being regulated by means of the stop-cock $i$ in the pipe $h'$.

Having thus fully described our invention, what we claim as new, and desire to secure by Letters Patent, is—

1. The stationary perforated pipe D, with twisted scraper G, provided with the channel or trough $d$, in combination with the exterior revolving cylinder B, substantially as and for the purposes herein set forth.

2. The semi-tubular scraper $f$, attached to and forming part of the scraper G, and working in the outlet-bearing $a$, for the purposes herein set forth.

3. The combination, with the cylinder B and perforated pipe D, of the hollow bearing $b$, with pinion $f$, and the pipe $h$, passing through said bearing, all as and for the purposes herein set forth.

4. The combination of the box A, revolving cylinder B, stationary perforated pipe D, with scraper G, the tank H, and pipes $h\ h'$, with stop-cocks $i$, all constructed substantially as and for the purposes herein set forth.

In testimony that we claim the foregoing we have hereunto set our hands and seals this 13th day of March, 1874.

JOHN D. CONNER. [L. S.]
MOODY G. FREEMAN. [L. S.]
MATTHEW FALOON. [L. S.]

Witnesses:
   THOS. SLADE,
   CHAS. BRAYTON.